July 12, 1938.   J. M. WELCH   2,123,390
FRONT DRIVE SCOOTER
Filed May 10, 1937
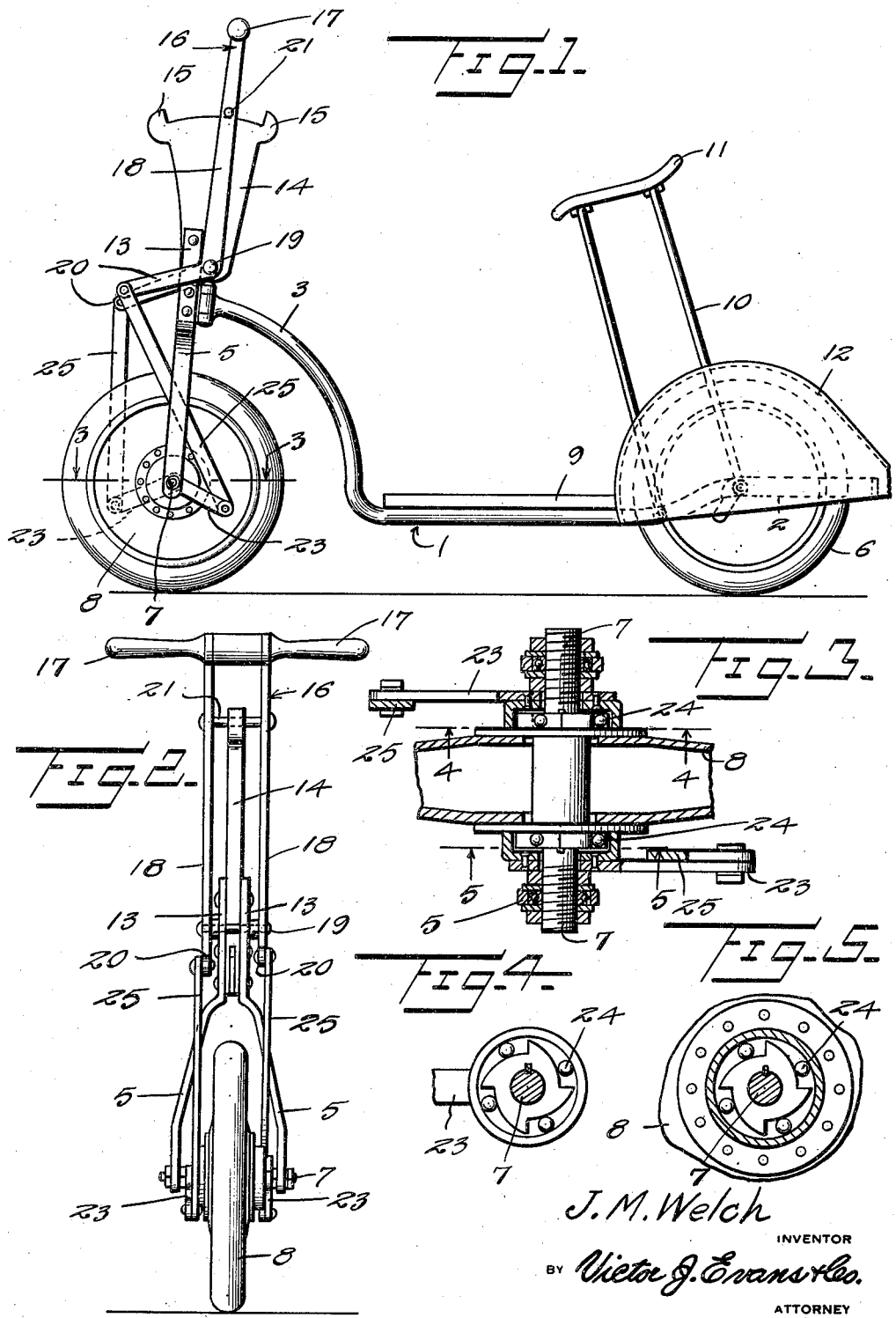

Patented July 12, 1938

2,123,390

UNITED STATES PATENT OFFICE 2,123,390

FRONT DRIVE SCOOTER

John M. Welch, Houston, Tex.

Application May 10, 1937, Serial No. 141,760

2 Claims. (Cl. 280—248)

This invention relates to scooters and more particularly to a propelling or drive means therefor, and has for the primary object the provision of a device of this character which will be simple and easy for a child to actuate for permitting the child to ride the device entirely free of the ground and to utilize the steering handle bar for driving the front wheel of the device.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a scooter constructed in accordance with this invention.

Figure 2 is a front elevation illustrating the device.

Figure 3 is a sectional view taken on the line 3—3 of Figure 1.

Figure 4 is a sectional view taken on the line 4—4 of Figure 3.

Figure 5 is a sectional view taken on the line 5—5 of Figure 3.

Referring in detail to the drawing, the numeral 1 indicates a scooter frame including a rear wheel fork 2 and an upwardly and forwardly curved portion 3 on which is journaled a front fork 5. The usual rear wheel 6 is journaled on the rear fork while the front fork 5 has secured thereto an axle 7 on which is journaled the front wheel 8. A floorboard 9 is mounted on the horizontal portion of the frame between the front and rear wheels on which a child may stand while operating the device. Extending upwardly and forwardly from the rear portion of the frame are seat standards 10 supporting a seat 11 on which a child may rest while standing on the floorboard. A fender or mudguard 12 is provided for the rear wheel. The front fork 5 extends above the journal of said fork onto the frame to provide attaching portions 13 to which is secured a plate 14 provided at its upper edge with a cutaway portion forming spaced shoulders or stops 15. A handle bar 16 includes hand grips 17 connected to spaced bars 18. The bars 18 are pivotally mounted on the plate 14, as shown at 19, and their lower ends are angularly disposed to form arms 20. A pin 21 connects the bars 18 and operates in the cutout portion of the plate 14 for limiting the pivotal movement of the handle bar by engaging the stops 15. The handle bar is moved in a forward and backward motion by the child standing on the floorboard 9. Arms 23 are journaled on the axle 7 and are connected to the front wheel by overrunning clutches 24. The arms 23 extend in opposite directions and are connected to the arms 20 of the handle bar by connecting links 25. The movement of the handle bar in either direction will impart a driving force on the front wheel through the arrangement of the overrunning clutches.

A device of the character described is extremely simple for a child to operate and will obviate the necessity of a child propelling the device by standing thereon with one foot and shoving upon the ground by the other foot.

What I claim is:

1. A scooter comprising a frame including a rest for a child, a rear fork on said frame, a rear wheel journaled on said fork, a front fork pivoted on said frame, an axle secured on said front fork, arms journaled on said axle, a front wheel journaled on said axle, overrunning clutches connecting said arms to said front wheel, bars pivoted on said front fork, connecting links joining the bars to said arms, a hand grip secured to said bars, a plate secured on said front fork and having a cutout portion providing spaced stops, a pin secured on said bars and operating in the cutout portion and engageable with the stops to limit the pivotal movement in either direction of said bars.

2. A scooter comprising a frame, a rear wheel rotatably mounted on said frame, a front fork pivoted on the frame, a wheel rotatably mounted in said front fork, manually operable bars pivoted on said front fork and operatively connected with the front wheel to alternately impart rotary movement thereto as the bars are oscillated, a plate secured on said front fork and having a cutout portion providing spaced stops, a pin secured on said bars and operating in the cutout portion and engageable with the stops to limit the pivotal movement in either direction of said bars.

JOHN M. WELCH.